United States Patent
Gopal et al.

(10) Patent No.: US 9,516,694 B2
(45) Date of Patent: Dec. 6, 2016

(54) METHOD AND APPARATUS FOR INTER RADIO ACCESS TECHNOLOGY (IRAT) CELL RESELECTION

(71) Applicant: QUALCOMM Incorporated, San Diego, CA (US)

(72) Inventors: Thawatt Gopal, San Diego, CA (US); Krishna Rao Mandadapu, San Diego, CA (US); Tom Chin, San Diego, CA (US); Qingxin Chen, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/092,182

(22) Filed: Nov. 27, 2013

(65) Prior Publication Data

US 2014/0378140 A1 Dec. 25, 2014

Related U.S. Application Data

(60) Provisional application No. 61/839,273, filed on Jun. 25, 2013.

(51) Int. Cl.
*H04W 36/00* (2009.01)
*H04W 76/04* (2009.01)
*H04W 48/16* (2009.01)
*H04W 48/18* (2009.01)
*H04W 88/06* (2009.01)

(52) U.S. Cl.
CPC .......... *H04W 76/048* (2013.01); *H04W 48/16* (2013.01); *H04W 48/18* (2013.01); *H04W 88/06* (2013.01)

(58) Field of Classification Search
CPC .......... H04W 76/048; H04W 36/0061; H04W 48/16; H04W 48/18; H04W 88/06
USPC ...................................................... 455/437
See application file for complete search history.

(56) References Cited

U.S. PATENT DOCUMENTS

| | | | |
|---|---|---|---|
| 2007/0004405 A1* | 1/2007 | Buckley | H04W 48/18 455/434 |
| 2008/0200169 A1* | 8/2008 | Gao | H04W 48/16 455/434 |

(Continued)

FOREIGN PATENT DOCUMENTS

WO    WO-2012/162633 A1    11/2012

OTHER PUBLICATIONS

George Cherian et al., "Add Serving PLMN Identifiers to E-UTRA neighbor", 3GPP2 TSG-C WG2.2 (7 pages).

(Continued)

*Primary Examiner* — Nathan Taylor
(74) *Attorney, Agent, or Firm* — Arent Fox LLP

(57) ABSTRACT

The present disclosure presents a method and an apparatus for inter radio access technology (IRAT) cell reselection. For example, the method may include identifying that a user equipment (UE) in an idle or a discontinuous reception (DRX) mode is camped on a cell of a first RAT, determining that the cell the UE is camped on is not broadcasting any neighbor cell of a second RAT, scanning for one or more frequencies of the second RAT based on the determination, and triggering a cell reselection to a cell of the second RAT, wherein the cell of the second RAT is associated with a frequency identified during the scanning. As such, an autonomous IRAT cell reselection may be achieved.

20 Claims, 9 Drawing Sheets

(56) References Cited

U.S. PATENT DOCUMENTS

| | | | |
|---|---|---|---|
| 2010/0075665 A1* | 3/2010 | Nader | H04J 11/0093 455/426.1 |
| 2010/0278142 A1* | 11/2010 | Dwyer et al. | 370/331 |
| 2010/0304749 A1 | 12/2010 | Dwyer et al. | |
| 2011/0039555 A1* | 2/2011 | Klasson | H04W 48/16 455/434 |
| 2011/0269462 A1* | 11/2011 | Sagfors | H04W 36/36 455/436 |
| 2012/0155383 A1* | 6/2012 | Singh et al. | 370/328 |
| 2012/0302241 A1* | 11/2012 | Klingenbrunn | H04W 48/16 455/436 |
| 2013/0070728 A1 | 3/2013 | Umatt et al. | |
| 2013/0182583 A1 | 7/2013 | Siomina et al. | |
| 2013/0225169 A1* | 8/2013 | Farnsworth et al. | 455/436 |
| 2013/0252614 A1* | 9/2013 | Hsu et al. | 455/437 |
| 2015/0139053 A1* | 5/2015 | Van Lieshout | H04W 52/0216 370/311 |

OTHER PUBLICATIONS

Van Minh Nguyen et al., "Handover Measurement in Mobile Cellular Networks: Analysis and Applications to LTE", IEEE ICC 2011 (6 pages).
International Search Report and Written Opinion—PCT/US2014/043745—ISA/EPO—May 21, 2012. (14 total pages).
Research in Motion UK LTD: "Reselection to E-UTRAN in the absence of E-UTRAN Neighbour cell list", 3GPP Draft; GP-090766 44018-900, 3rd Generation Partnership Project (3GPP), Mobile Competence Centre ; 650, Route Des Lucioles ; F-06921 Sophia-Antipolis Cedex ; France, vol. TSG GERAN, no. Shenzhen; May 11, 2009, May 6, 2009 (May 6, 2009), XP050414908, [retrieved on May 6, 2009] pp. 1,11,13.

\* cited by examiner

METHOD AND APPARATUS FOR INTER RADIO ACCESS TECHNOLOGY (IRAT) CELL RESELECTION

CLAIM OF PRIORITY UNDER 35 U.S.C. §119

The present application for patent claims priority to U.S. Provisional Patent Application No. 61/839,273, filed Jun. 25, 2013, entitled "Method and Apparatus for Inter Radio Access Technology (IRAT) Cell Reselection," which is assigned to the assignee hereof, and hereby expressly incorporated by reference herein.

BACKGROUND

Aspects of the present disclosure relate generally to wireless communication systems, and more particularly, to inter radio access technology (IRAT) cell reselection.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

When a user equipment (UE) is camped on a 2G/3G cell and the 2G/3G cell is not broadcasting any 4G IRAT neighbor cell information on the broadcast channel of the 2G/3G cell, the UE may not perform an IRAT cell reselection to the 4G cell.

Therefore, there is a desire for a method and an apparatus for an autonomous inter radio access technology (IRAT) cell reselection.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents an example method and apparatus for inter radio access technology (IRAT) cell reselection. For example, the present disclosure presents an example method for identifying that a user equipment (UE) in an idle or a discontinuous reception (DRX) mode is camped on a cell of a first RAT, wherein the cell belongs to a public land mobile network identifier (PLMN-ID) associated with an operator and the first RAT, determining that the cell associated PLMN identifier belongs to a known list of PLMN identifiers, determining that the cell the UE is camped on is not broadcasting any neighbor cell of a second RAT, scanning for one or more frequencies of the second RAT based on the determination, and triggering a cell reselection to a cell of the second RAT, wherein the cell of the second RAT is associated with a frequency identified during the scanning.

In an additional aspect, an apparatus for inter radio access technology (IRAT) cell reselection is disclosed. The apparatus may include means for identifying that a user equipment (UE) in an idle or a discontinuous reception (DRX) mode is camped on a cell of a first RAT, wherein the cell belongs to a public land mobile network identifier (PLMN-ID) associated with an operator and the first RAT, means for determining that the cell associated PLMN identifier belongs to a known list of PLMN identifiers, means for determining that the cell the UE is camped on is not broadcasting any neighbor cell of a second RAT, means for scanning for one or more frequencies of the second RAT based on the determination, and means for triggering a cell reselection to a cell of the second RAT, wherein the cell of the second RAT is associated with a frequency identified during the scanning.

In a further aspect, a computer program product for inter radio access technology (IRAT) cell reselection is described. The computer program product may include a computer-readable medium comprising code executable by a computer for identifying that a user equipment (UE) in an idle or a discontinuous reception (DRX) mode is camped on a cell of a first RAT, wherein the cell belongs to a public land mobile network identifier (PLMN-ID) associated with an operator and the first RAT, determining that the cell associated PLMN identifier belongs to a known list of PLMN identifiers, determining that the cell the UE is camped on is not broadcasting any neighbor cell of a second RAT, scanning for one or more frequencies of the second RAT based on the determination, and triggering a cell reselection to a cell of the second RAT, wherein the cell of the second RAT is associated with a frequency identified during the scanning.

Moreover, the present disclosure presents an apparatus for inter radio access technology (RAT) cell reselection. The apparatus may include a RAT identifying component to identify that a user equipment (UE) in an idle or a discontinuous reception (DRX) mode is camped on a cell of a first RAT, wherein the cell belongs to a public land mobile network identifier (PLMN-ID) associated with an operator and the first RAT, a PLMN identifier matching component to determine that the cell associated PLMN identifier belongs to a known list of PLMN identifiers, a neighbor broadcasting determining component to determine that the cell the UE is camped on is not broadcasting any neighbor cell of a second RAT, a frequency scanning component to scan for one or more frequencies of the second RAT based on the determination, and a cell reselection component to trigger a cell reselection to a cell of the second RAT, wherein the cell of the second RAT is associated with a frequency identified during the scanning.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides a method and apparatus for inter radio access technology (IRAT) cell reselection. For example, the method may include detecting that a UE is camped on a cell of a first RAT type, wherein the cell belongs to a public land mobile network identifier (PLMN-ID) associated with an operator and the first RAT, determining that the cell associated PLMN identifier belongs to a known list of PLMN identifiers, determining that the UE is in an idle or a discontinuous reception (DRX) mode, identifying that the cell the UE is camped on is not broadcasting neighbor cells of a second RAT type, scanning for frequencies of the second RAT type based on the identifying, and performing a cell reselection to a cell of the second RAT type at least based on the scanning.

Figure 1:
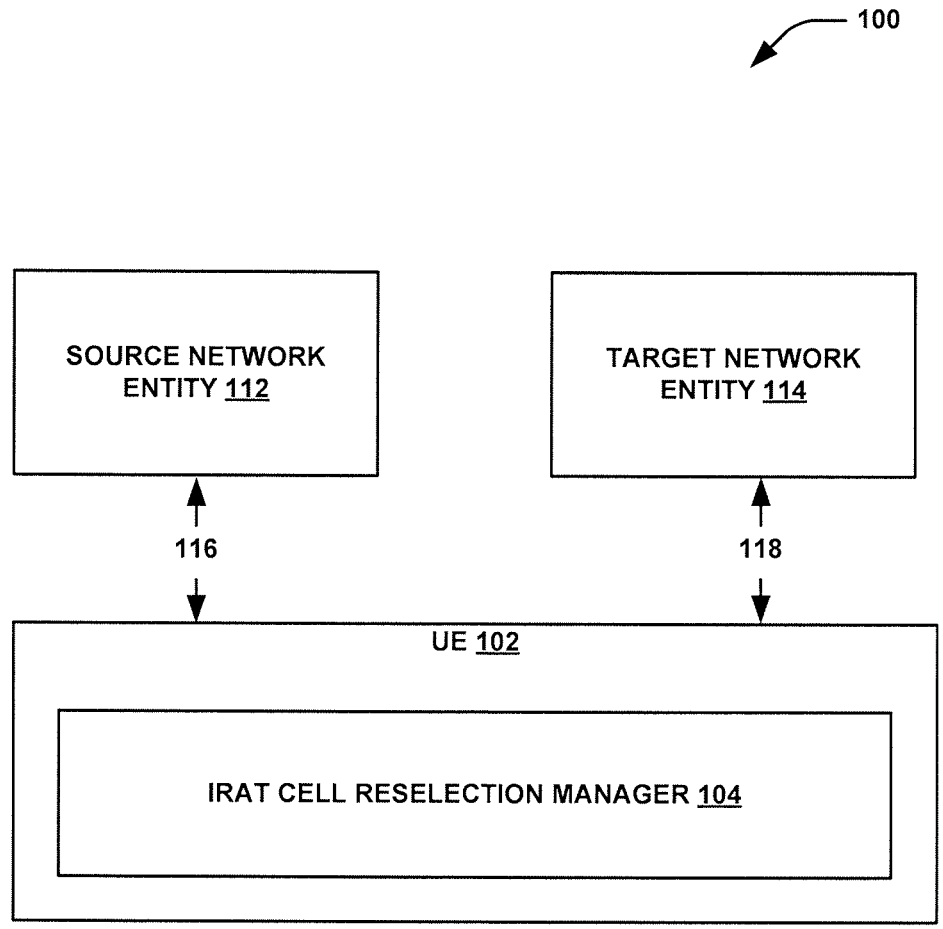
FIG. 1 is a block diagram illustrating an example wireless system of aspects of the present disclosure.

Referring to FIG. 1, a wireless communication system 100 is illustrated that facilitates an autonomous inter radio access technology (IRAT) cell reselection. System 100 includes user equipment (UE) 102 that may communicate with one or more network entities, for example, network entity 112 and/or network entity 114, via one or more over-the-air links 116 and/or 118, respectively. In an aspect, UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In an aspect, network entity 112 and/or 114 may include, but are not limited to, an access point, a base station (BS) or Node B or eNodeB, a macro cell, a femtocell, a pico cell, a relay, a peer-to-peer device, an authentication, authorization and accounting (AAA) server, a mobile switching center (MSC), etc. Additionally, network entity 112 and/or 114 may include one or more of any type of network component that can enable UE 102 to communicate and/or establish and maintain link 116 and/or 118 to respectively communicate with network entity 112 and/or network entity 114. Furthermore, the one or more network entities 114 may be, or be associated with, a candidate for cell reselection when UE 102 performs a cell reselection after an autonomous scanning of LTE frequencies In an example aspect, network entity 112 may operate according to a 2nd generation (2G) or a third generation (3G) radio access technology (RAT) standard as defined in 3GPP or 3GPP2 Specification. For example, 2G/3G RAT may include, but not limited to Global System for Mobile Communications (GSM), Code Division Multiple Access (CDMA), Wideband-CDMA (W-CDMA) or High Speed Packet Access (HSPA). In an aspect, network entity 114 may operate according to a 4th Generation (4G) radio access technology (RAT) standard, for example, long term evolution (LTE) or Worldwide Interoperability for Microwave Access (WiMAX).

Furthermore, UE 102 may include an IRAT cell reselection manager 104 which may be configured to manage inter radio access technology (IRAT) cell reselection, for example, from a 2G/3G cell to a 4G/LTE cell, by identifying that a user equipment (UE) in an idle or a discontinuous reception (DRX) mode is camped on a cell of a first RAT, wherein the cell belongs to a public land mobile network identifier (PLMN-ID) associated with an operator and the first RAT, determining that the cell associated PLMN identifier belongs to a known list of PLMN identifiers, determining that the cell the UE is camped on is not broadcasting any neighbor cell of a second RAT, scanning for one or more frequencies of the second RAT based on the determination, and triggering a cell reselection to a cell of the second RAT, wherein the cell of the second RAT is associated with a frequency identified during the scanning.

Figure 2:
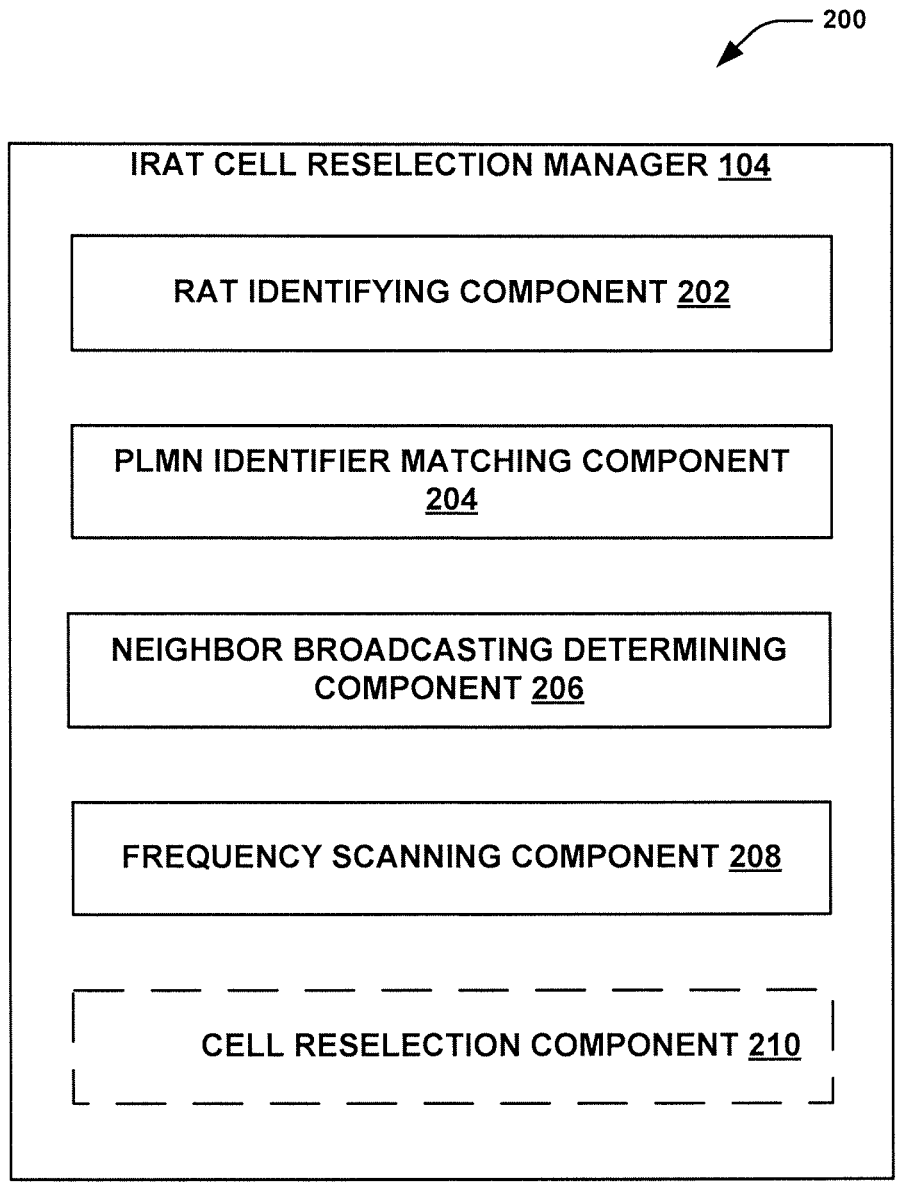
FIG. 2 is a block diagram illustrating an example inter radio access technology (IRAT) cell reselection manager.

FIG. 2 illustrates an example IRAT cell reselection manager 104 and various components that may be included in some aspects of IRAT cell reselection manager 104 for inter radio access technology (IRAT) cell reselection.

For example, in an aspect, IRAT cell reselection manager 104 may include one or more of a RAT type identifying component 202, PLMN identifier matching component 204, a neighbor broadcasting determining component 206, a frequency scanning component 208, and/or an optional cell reselection component 210.

In an aspect, when UE is camped on a 2G/3G cell, the 2G/3G cell may not broadcast any 4G neighbor cell information due to various reasons. For example, in an aspect, UE 102 may be camped on network entity 112 which may not broadcast 4G neighbor cell information as network entity 112 is not upgraded to broadcast corresponding EUTRAN neighbor information, e.g., information of target network entity 114. That is, network entity 112 may not be upgraded to broadcast corresponding E-TRAN neighbor information on GERAN (SI2qtr) or UTRAN (SIB19). For example, the network has to be upgraded to 3GPP Release 8 to broadcast EUTRA neighbor information via SIB19 for TD-SCDMA or via SI2qtr for GSM as SIB19 and SI2qtr carries neighbor cell list for TD-SCDMA and GSM respectively.

Additionally, network planning inaccuracies or obsolete IRAT neighbor cell information in corresponding GERAN or UTRAN may cause missing EUTRA neighbor information being broadcasted to the UEs resulting in UE 102 not being able to perform IRAT cell reselection to a 4G cell. Furthermore, frequent changes to networks during initial network deployment may cause newly added EUTRA information to become missing from corresponding neighbors or co-located cells. For example, TD-SCDMA/SIB-19 may be broadcasted but may not reflect presence of E-UTRA cells/frequencies.

For UE 102 to perform IRAT cell reselection, e.g., cell reselection to a 4G cell, network entity 112 on which the UE is camped on has to broadcast neighbor cell information, that is, information of network entity 114. If not, UE 102 may not be able to perform an IRAT cell reselection.

In an aspect, RAT identifying component 202 may be configured to identify that a UE in an idle mode or a discontinuous (DRX) mode is camped on a cell of a first RAT, wherein the cell belongs to a public land mobile network identifier (PLMN-ID) associated with an operator and the first RAT. For example, RAT identifying component 202 may be configured to identify that UE 102 is camped on a cell in network entity 112, e.g., 2G/3G cell. That means, network entity 112 which is a 2G/3G network is currently providing service to UE 102. In an additional aspect, UE 102 may be in an IDLE or DRX mode during cell reselection. In an aspect, the cell the UE is camped on may belong to a PLMN associated with an operator and the first RAT.

However, if it is identified that the 2G/3G cells broadcast information on LTE neighbor cells, then cell reselection procedures based on 3GPP Specifications may be used to perform cell reselection to LTE cell when IRAT reselection criteria are met. In an additional aspect, RAT type identifying component 202 may be further configured to identify that the UE is an idle or DRX mode.

In an aspect, PLMN identifier matching component 204 may be configured to determine that the cell associated PLMN identifier belongs to a known list of PLMN identifiers. For example, in an aspect, the cell the UE is camped on may belong to a list of known PLMN identifiers. That is, the cell the UE is currently is camped on belongs to PLMN ID associated with an operator and a specific RAT type associated with the operator that may have enabled functionality disclosed herein. In an additional or optional aspect, this functionality may be enabled or disabled on an operator basis and/or RAT type associated with that operator.

In an aspect, neighbor broadcasting determining component 206 may be configured to determine that the cell the UE is camped on is not broadcasting any neighbor cell of a second RAT. For example, in an aspect, UE camped on network entity 112 may not be broadcasting network entity 114 information. As a result, UE 102 may not be aware of any 4G cell neighbor cells. This may prevent the UE from reselecting to a 4G cell, e.g., network entity 114. The reasons network entity is not broadcasting information of neighboring cells is described above in detail.

In an aspect, frequency scanning component 208 may be configured to scan for one or more frequencies of the second RAT based on the determination. For example, in an aspect, once it is determined that network entity 112 is not broadcasting any 4G neighbor cell information, the UE may start scanning for any 4G frequencies. In an additional aspect, the UE has to scan for any 4G frequencies as network entity 112 will not be broadcasting any 4G neighbor cell information. In an additional aspect, the 4G frequencies that may be scanned may be dependent on the operator's PLMN-ID that UE is camped on currently. For example, the scanning for LTE frequencies is performed only for the LTE frequencies of the operator the UE is currently camped. If the scanning is performed for all the 40 LTE bands, it consumes a lot of power and time.

In an aspect, cell reselection component 210 may be configured to trigger a cell reselection to a cell of the second RAT wherein the cell of the second RAT is associated with a frequency identified during the scanning. For example, in an aspect, cell reselection component 210 may be configured to trigger a cell reselection to a cell of network entity 114 wherein the cell is associated with the frequency identified during the frequency scanning.

In an additional or optional aspect, the scanning for one or more frequencies is performed when the UE is an idle or DRX mode. The disclosure introduces certain features to ensure the scans are carried out efficiently when certain criteria are met. For example, RAT identifying component may be configured to determine whether the UE is an idle or DRX mode as where there is no connection when the UE is in idle mode and the UE has lower energy consumption. In a DRX mode, the UE is monitoring a physical channel for any paging messages and has relatively lower power consumption.

In an example aspect, scanning for 4G frequencies may be performed when a 2G or 3G cell the UE is camped on is not broadcasting LTE neighbor cells. If LTE neighbor cells are broadcasted in 2G or 3G cells, then standards based procedures following that described in 3GPP specs can be used to perform IRAT reselections to the LTE cell when IRAT reselections are met. In an additional aspect, the scans may be autonomous, triggered by the UE without any intervention from the network.

The scanning for all LTE frequency bands may not be energy efficient as LTE 3GPP specifications supports approximately 40 LTE frequency bands. Additionally, the scanning for all LTE 40 frequency bands may take a long time and/or drain the battery power of the UE.

In an aspect, the scanning for LTE frequencies may be customized for a specific public land mobile network (PLMN) or frequency bands. For example, once the UE is camped on a 2G/3G cell, the UE can determine PLMN ID and EPHLMN-IDs of the network the UE is camped on. The EPHLMN-IDs for an operator network may be stored in the local memory of the UE or a SIM/U-SIM card of the UE. As a result, the scanning for LTE frequencies by UE 102 may be customized for the specific LTE bands supported by the operator's network. This customized scanning saves time and power consumption at the UE.

For example, LTE 3GPP Specification supports approximately 40 LTE frequency bands. The scanning by the UE for about 40 LTE frequency bands may take a longer time and drain the battery power of the UE. However, if the scanning for LTE frequencies at the UE is customized to scan only for LTE frequency bands supported by the network operator, it is relatively much more efficient.

In an additional aspect, once an LTE frequency is found, the UE checks to determine whether cell reselection criteria are met. If it is determined that cell reselection criteria are met, the cell reselection procedure to the LTE cell is triggered by suspending activities on the current cell (e.g., 2G/3G cell), acquiring a target cell (e.g., 4G cell), stopping activities on the current cell (e.g., 2G/3G cell), and transitioning the UE to the target cell (e.g., LTE cell).

In an additional or optional aspect, a configuration parameter at UE 102 may be used to enable or disable scanning for LTE frequencies. The enabling or disabling of the scanning mechanism may be through a user interface (UI) at the UE. When the scanning mechanism is enabled, the UE scans for LTE frequencies. The search for LTE frequencies is generally executed in the background. In an additional aspect, a configurable search timer may be used to configure the scanning parameters. Additionally, the enabling/disabling of the scanning mechanism may be pre-configured during manufacturing or the user of the UE may enable/disable depending on the network configuration.

In an aspect, the scanning for 4G frequencies may be dependent on PLMN IDs provisioned in the UE, EHPMLNs of the network the UE is currently camped, RAT of the network the UE is camped on, and when no EUTRA frequencies are broadcasted.

In an additional aspect, the scanning for 4G frequencies may be triggered via a background command to EUTRA L3 layer (e.g., LTE RRC layer) with an associated scan search timer. The scan search timer may define the time the RRC layer has before responding with the scanning results.

In an optional aspect, the UE may abort a current scan to for 4G frequencies due to a high-priority event such as the user decides to make a voice call. Additionally, the UE may suspend and resume a current background scan for 4G frequencies due to pre-defined events such as making a data call.

Figure 3:
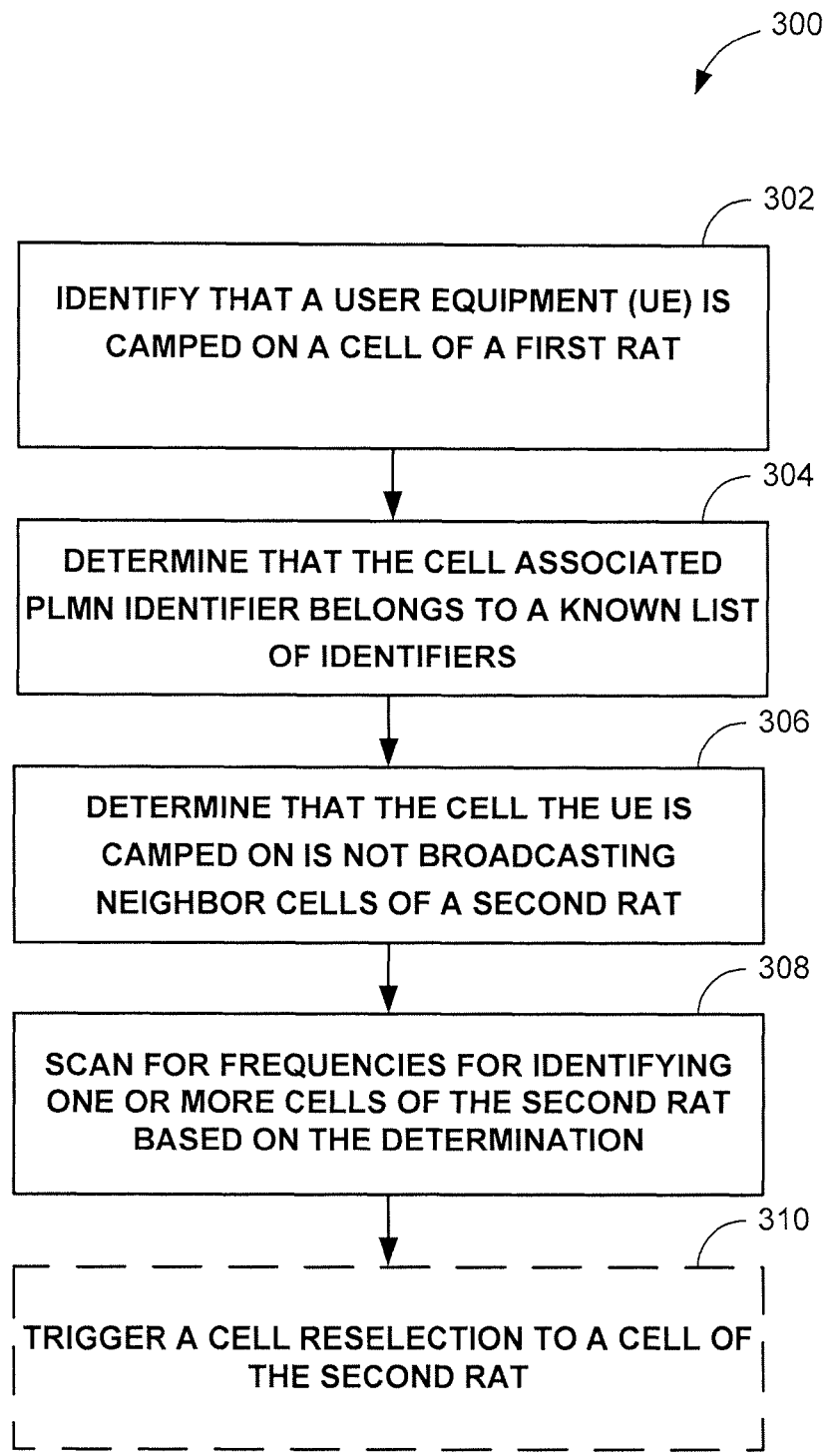
FIG. 3 is an example flow chart of inter radio access technology (IRAT) cell reselection.

FIG. 3 illustrates an example methodology 300 for inter radio access technology (IRAT) cell reselection. In an aspect, at block 302, methodology 300 may include identifying that a user equipment (UE) in an idle or a discontinuous reception (DRX) mode is camped on a cell of a first RAT. For example, IRAT cell reselection manager 104 and/or RAT identifying component 202 may identify the UE 102 is camped on a 2G/3G cell or on network entity 112. In an additional aspect, IRAT cell reselection manager 104 and/or RAT identifying component 202 may be configured to identify that the UE is in an idle or a DRX mode.

Additionally, at block 304, methodology 300 may include determining that the cell associated PLMN identifier belongs to a known list of PLMN identifiers. For example, in an aspect, IRAT cell reselection manager 104 and/or PLMN identifier matching component 204 may be configured to determine that the cell the UE is camped on is associated with a PLMN identifier that belongs to a known list of PLMN identifiers.

Further, at block 306, methodology 300 may include determining that the cell the UE is camped on is not broadcasting neighbor cells of a second RAT. For example, in an aspect, IRAT cell reselection manager 104 and/or neighbor broadcasting determining component 206 may be configured to determine that the 2G/3G cell the UE is camped on is not broadcasting any 4G frequencies.

Furthermore, at block 308, methodology 300 may include scanning for frequencies for identifying one or more cells of the second RAT based on the determination. For example, in an aspect, IRAT cell reselection manager 104 and/or frequency scanning component 208 may be configured to scan for 4G frequencies, for example, LTE frequencies, to identify one or more 4G cells for cell reselection.

In an optional aspect, at block 310, methodology 300 may include triggering a cell reselection to a cell of the second RAT, wherein the cell of the second RA is associated with a frequency identified during the reselection. For example, in an aspect, IRAT cell reselection manager 104 and/or reselection component 210 may optionally be configured to trigger a cell reselection to a 4G cell identified during the scanning.

Figure 4:
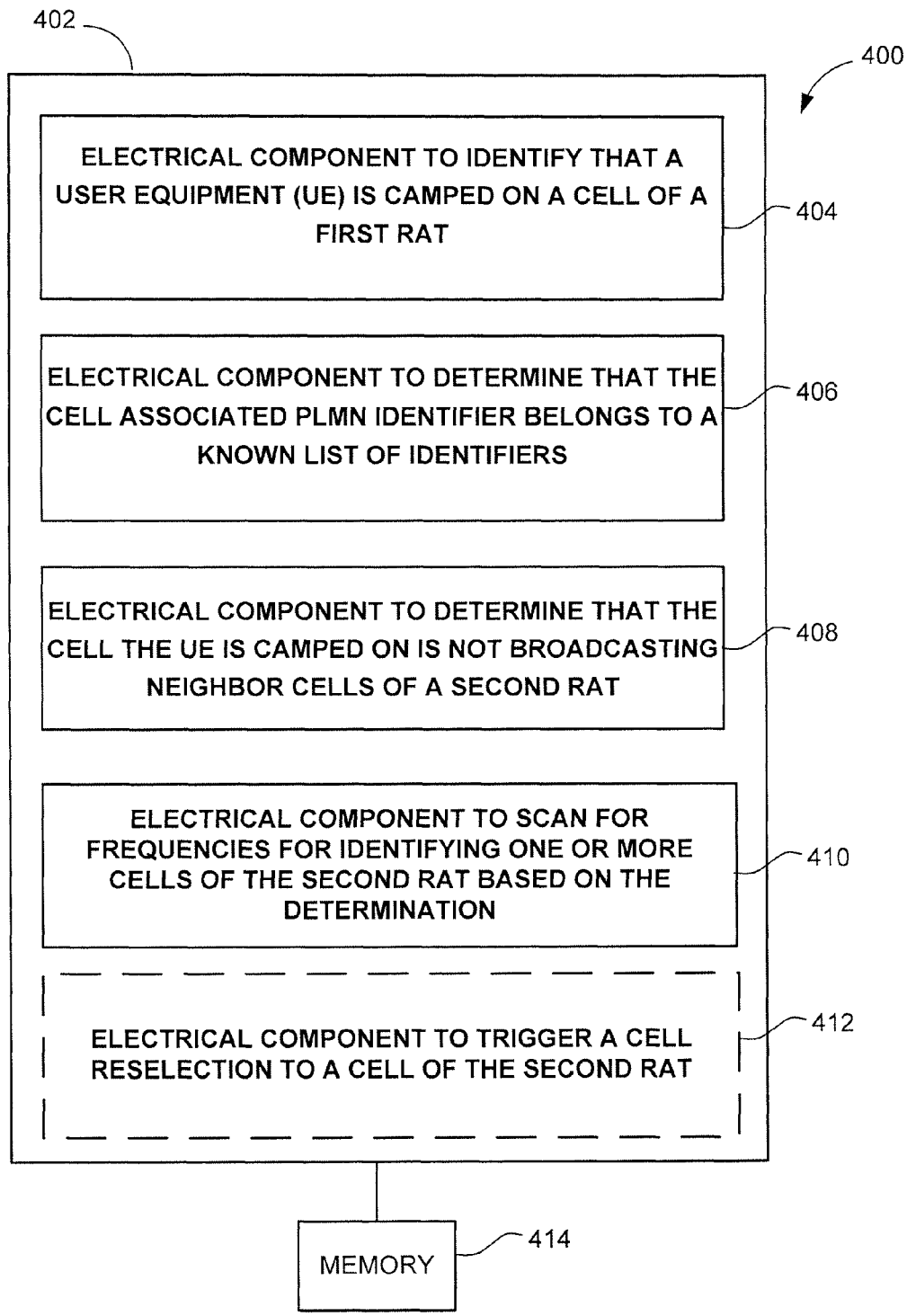
FIG. 4 is a block diagram illustrating aspects of a logical grouping of electrical components as contemplated by the present disclosure.

Referring to FIG. 4, an example system 400 is displayed for inter radio access technology (IRAT) cell reselection. For example, system 400 may reside at least partially within a user equipment, for example, UE 102 (FIG. 1) and/or IRAT cell reselection manager 104 (FIGS. 1-2). It is to be appreciated that system 400 is represented as including functional blocks, which may be functional blocks that represent functions implemented by a processor, software, or combination thereof (for example, firmware). System 400 includes a logical grouping 402 of electrical components that can act in conjunction. For instance, logical grouping 402 may include an electrical component 404 to identify that a user equipment (UE) in an idle or a discontinuous reception (DRX) mode is camped on a cell of a first RAT. In an aspect, electrical component 404 may comprise IRAT cell reselection manager 104 (FIGS. 1-2) and/or RAT identifying component 202 (FIG. 2).

Additionally, logical grouping 402 may include an electrical component 406 to determine that the cell associated PLMN identifier belongs to a known list of PLMN identifiers. In an aspect, electrical component 406 may comprise IRAT cell reselection manager 104 (FIGS. 1-2) and/or PLMN identifier matching component 204 (FIG. 2).

Further, logical grouping 402 may include an electrical component 408 to determine that the cell the UE is camped on is not broadcasting neighbor cells of a second RAT. In an aspect, electrical component 408 may comprise IRAT cell reselection manager 104 (FIGS. 1-2) and/or neighbor broadcasting determining component 206 (FIG. 2).

Furthermore, logical grouping 402 may include an electrical component 410 to scan for frequencies for identifying one or more cells of the second RAT based on the determination. In an aspect, electrical component 410 may comprise IRAT cell reselection manager 104 (FIGS. 1-2) and/or frequency scanning component 208 (FIG. 2).

Additionally, logical grouping 402 may include an electrical component 412 to trigger a cell reselection to a cell of the second RAT, wherein the cell of the second RAT is associated with a frequency identified during the scanning. In an aspect, electrical component 412 may comprise IRAT cell reselection manager 104 (FIGS. 1-2) and/or cell reselection component 210 (FIG. 2).

Additionally, system 400 may include a memory 414 that retains instructions for executing functions associated with the electrical components 404, 406, 408, 410, and 412, stores data used or obtained by the electrical components 404, 406, 408, 410, and 412, etc. While shown as being external to memory 414 it is to be understood that one or more of the electrical components 404, 406, 408, 410, and 412 may exist within memory 414. In one example, electrical components 404, 406, 408, 410, and 412 may comprise at least one processor, or each electrical component 404, 406, 408, 410, and 412 may be a corresponding module of at least one processor. Moreover, in an additional or alternative example, electrical components 404404, 406, 408, 410, and 412 may be a computer program product including a computer readable medium, where each electrical component 404, 406, 408, 410, and 412 may be corresponding code.

Figure 5:
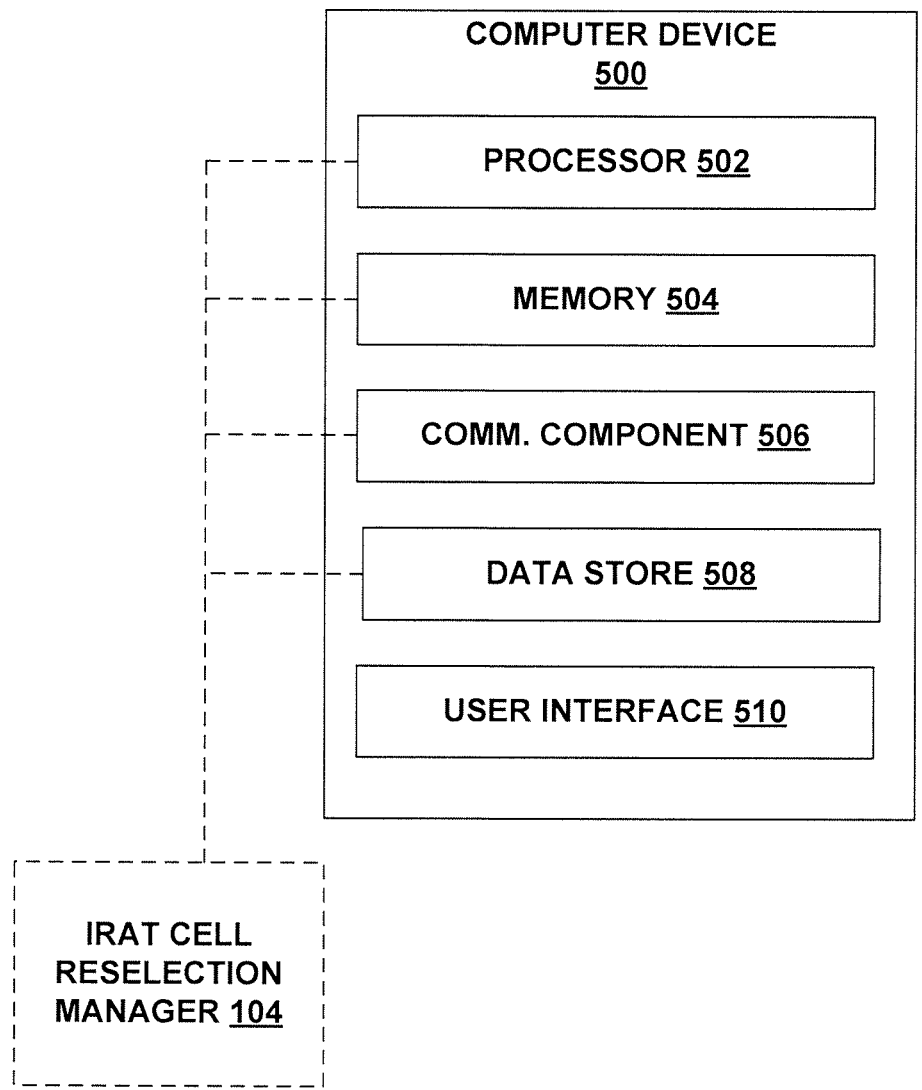
FIG. 5 is a block diagram illustrating aspects of a computer device according to the present disclosure.

Referring to FIG. 5, in one aspect, UE 102 and/or IRAT cell reselection manager 104 may be represented by a specially programmed or configured computer device 400. In one aspect of implementation, computer device 500 may include IRAT cell reselection manager 104 (FIG. 1) and/or IRAT cell reselection manager 104 (FIGS. 1-2), such as in specially programmed computer readable instructions or code, firmware, hardware, or some combination thereof.

Computer device 500 includes a processor 502 for carrying out processing functions associated with one or more of components and functions described herein. Processor 502 may include a single or multiple set of processors or multi-core processors. Moreover, processor 502 may be implemented as an integrated processing system and/or a distributed processing system.

Computer device 500 further includes a memory 504, such as for storing data used herein and/or local versions of applications being executed by processor 502. Memory 504 may include any type of memory usable by a computer, such as random access memory (RAM), read only memory (ROM), tapes, magnetic discs, optical discs, volatile memory, non-volatile memory, and any combination thereof.

Further, computer device 500 includes a communications component 506 that provides for establishing and maintaining communications with one or more parties utilizing hardware, software, and services as described herein. Communications component 506 may carry communications between components on computer device 500, as well as between computer device 500 and external devices, such as devices located across a communications network and/or devices serially or locally connected to computer device 500. For example, communications component 506 may include one or more buses, and may further include transmit chain components and receive chain components associated with a transmitter and receiver, respectively, or a transceiver, operable for interfacing with external devices. In an additional aspect, communications component 506 may be configured to receive one or more pages from one or more subscriber networks. In a further aspect, such a page may correspond to the second subscription and may be received via the first technology type communication services.

Additionally, computer device 500 may further include a data store 508, which may be any suitable combination of hardware and/or software, that provides for mass storage of information, databases, and programs employed in connection with aspects described herein. For example, data store 508 may be a data repository for applications not currently being executed by processor 502 and/or any threshold values or finger position values.

Computer device 500 may additionally include a user interface component 510 operable to receive inputs from a user of computer device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Figure 6:
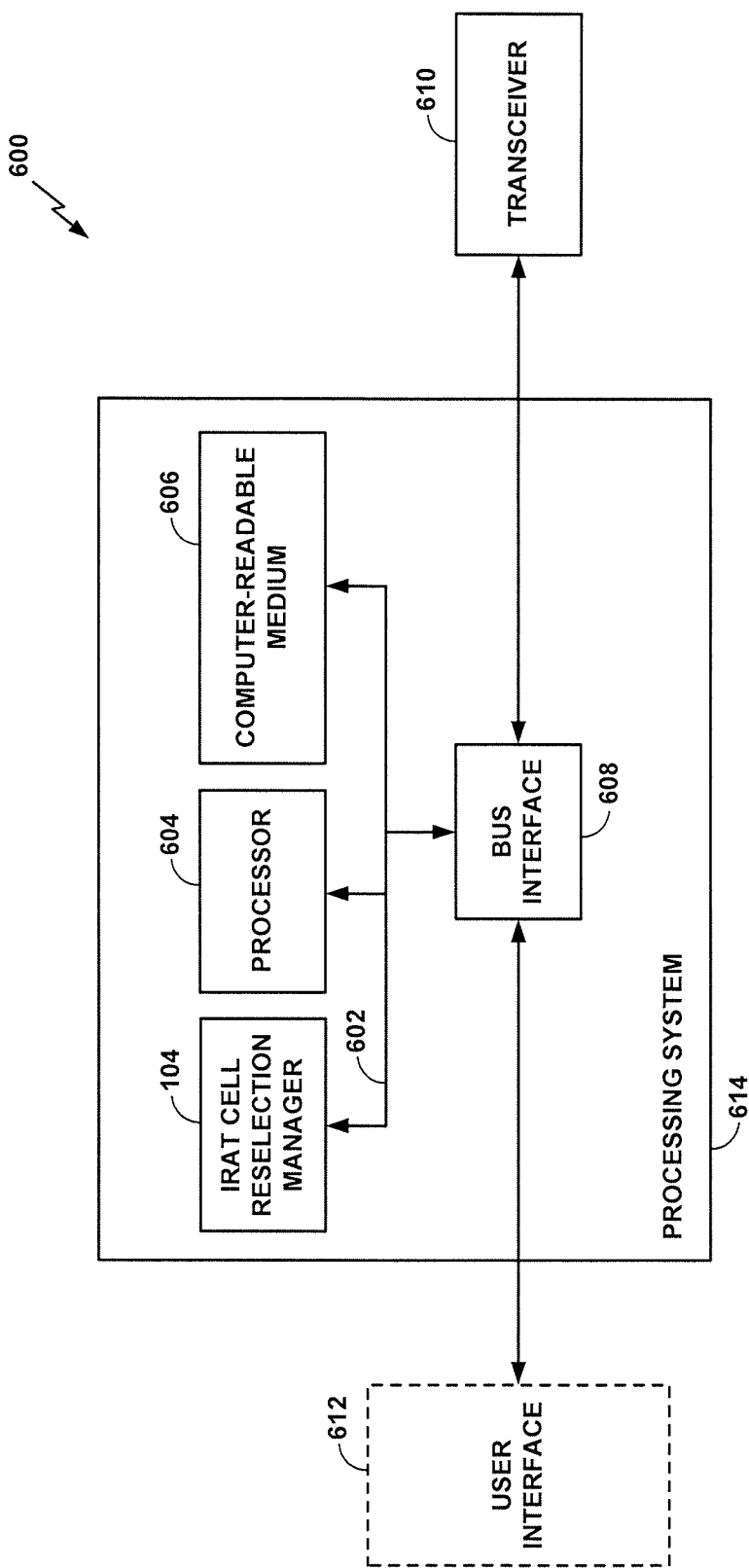
FIG. 6 is a block diagram illustrating an example of a hardware implementation for an apparatus employing a processing system.

FIG. 6 is a block diagram illustrating an example of a hardware implementation for an apparatus 600, for example, including IRAT cell reselection manager 104 (FIG. 1), employing a processing system 614 for carrying out aspects of the present disclosure, such as method for IRAT cell reselection. In this example, the processing system 614 may be implemented with bus architecture, represented generally by a bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, and one or more components described herein, such as, but not limited to, IRAT cell reselection manage 104, RAT identifying component 204, neighbor broadcasting determining component 206, frequency scanning component 208, and/or cell reselection component 210 (FIGS. 1-2). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

Figure 7:
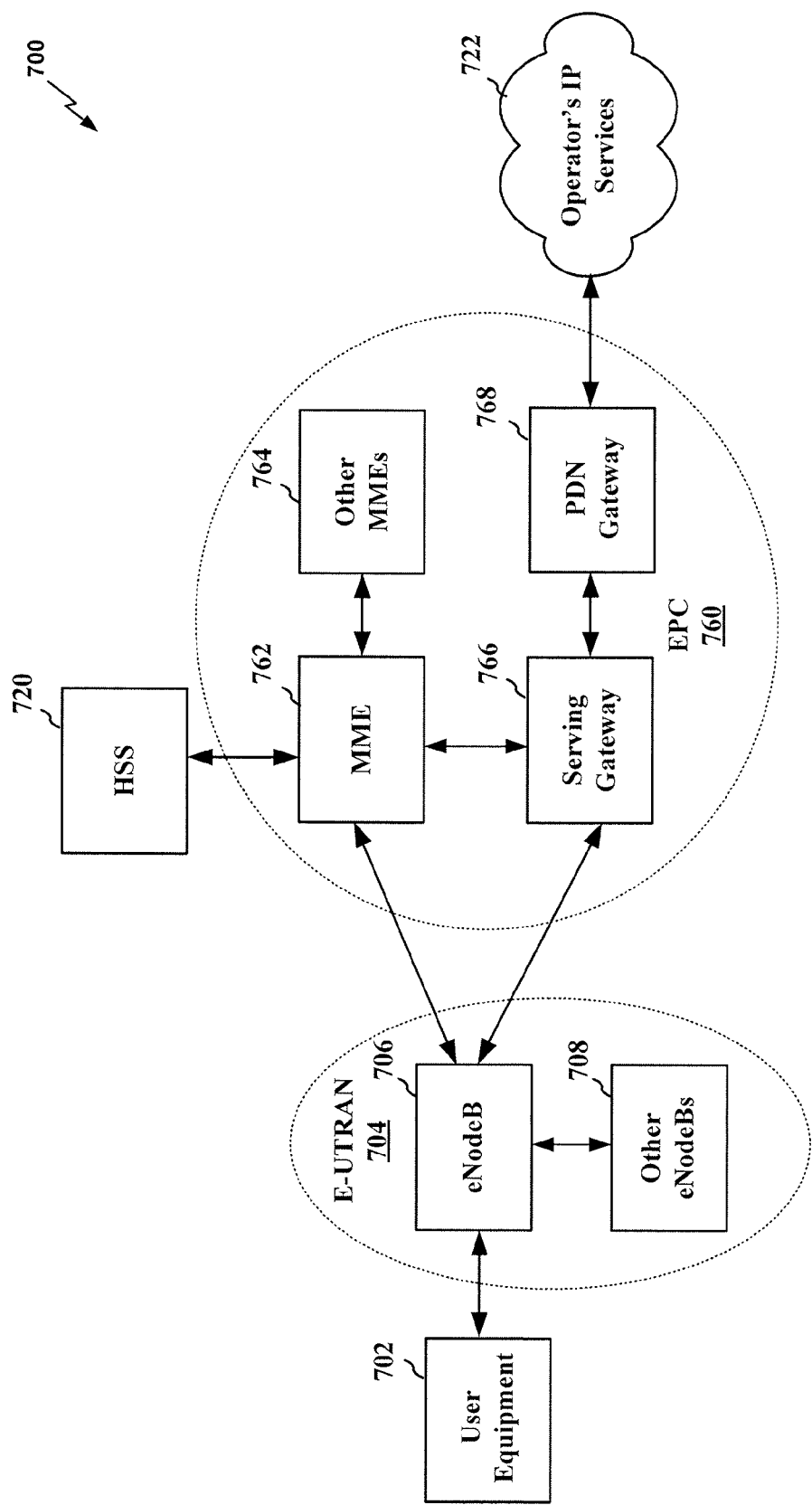
FIG. 7 is a block diagram conceptually illustrating an example of a telecommunications system.

FIG. 7 is a diagram illustrating a long term evolution (LTE) network architecture 700 employing various apparatuses of wireless communication system 100 (FIG. 1) and may include one or more user equipment (UE) configured to include an IRAT cell reselection manager 104 (FIG. 1). The LTE network architecture 700 may be referred to as an Evolved Packet System (EPS) 700. EPS 700 may include one or more user equipment (UE) 702, an Evolved UMTS Terrestrial Radio Access Network (E-UTRAN) 704, an Evolved Packet Core (EPC) 760, a Home Subscriber Server (HSS) 720, and an Operator's IP Services 722. The EPS may interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 706 and other eNBs 708. The eNB 706 provides user and control plane protocol terminations toward the UE 702. The eNB 706 may be connected to the other eNBs 708 via an X2 interface (i.e., backhaul). The eNB 706 may also be referred to by those skilled in the art as a base station, a base transceiver station, a radio base station, a radio transceiver, a transceiver function, a basic service set (BSS), an extended service set (ESS), or some other suitable terminology. The eNB 706 provides an access point to the EPC 760 for a UE 702. Examples of UEs 702 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 702 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 706 is connected by an S1 interface to the EPC 760. The EPC 760 includes a Mobility Management Entity (MME) 762, other MMEs 764, a Serving Gateway 766, and a Packet Data Network (PDN) Gateway 768. The MME 762 is the control node that processes the signaling between the UE 702 and the EPC 710. Generally, the MME 762 provides bearer and connection management. All user IP packets are transferred through the Serving Gateway 766, which itself is connected to the PDN Gateway 768. The PDN Gateway 768 provides UE IP address allocation as well as other functions. The PDN Gateway 768 is connected to the Operator's IP Services 722. The Operator's IP Services 722 includes the Internet, the Intranet, an IP Multimedia Subsystem (IMS), and a PS Streaming Service (PSS).

Figure 8:
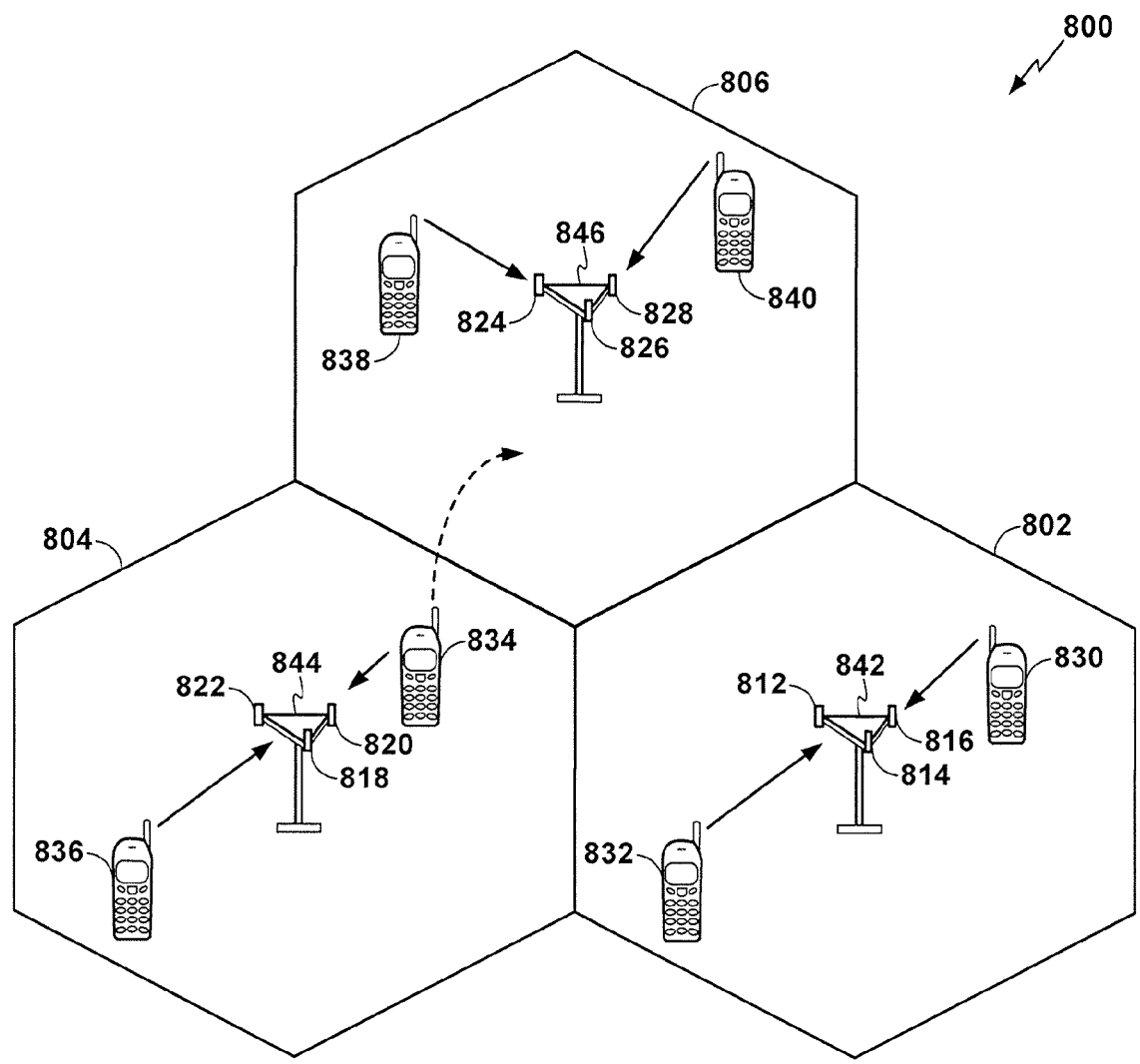
FIG. 8 is a conceptual diagram illustrating an example of an access network.

Referring to FIG. 8, an access network 800 in a UTRAN architecture is illustrated, and may include one or more user equipment (UE) configured to include an IRAT cell reselection manager 104 (FIG. 1). The multiple access wireless communication system includes multiple cellular regions (cells), including cells 802, 804, and 806, each of which may include one or more sectors and which may base network entity 112 and/or network entity 114 of FIG. 1. The multiple sectors may be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, for example, including UE 102 of FIG. 1, which may be in communication with one or more sectors of each cell 802, 804 or 806. For example, UEs 830 and 832 may be in communication with NodeB 842, UEs 834 and 836 may be in communication with NodeB 844, and UEs 838 and 840 may be in communication with NodeB 846. Here, each NodeB 842, 844, 846 is configured to provide an access point for all the UEs 830, 832, 834, 836, 838, 840 in the respective cells 802, 804, and 806. Additionally, each NodeB 842, 844, 846 may be network entity 112,114 of FIG. 1, and/or each UE 830, 832, 834, 836, 838, 840 may be UE 102 of FIG. 1, and may perform the methods outlined herein.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at EPC 760 (FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set). In any case, UE 834 may execute reselection manager 104 to perform the reselection operations described herein.

Further, the modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
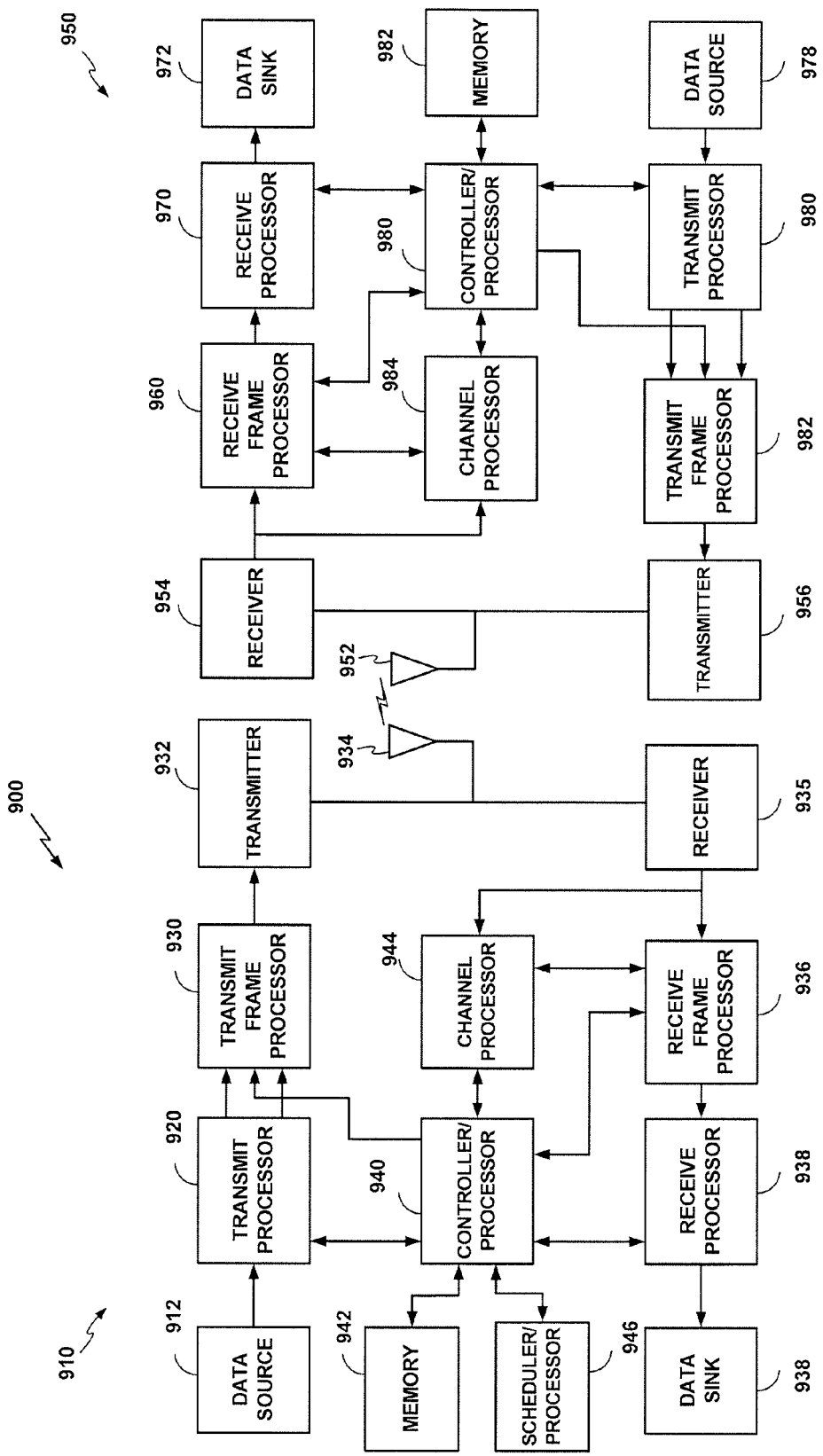
FIG. 9 is a block diagram conceptually illustrating an example of a NodeB in communication with a UE in a telecommunications system.

FIG. 9 is a block diagram of a NodeB 910 in communication with UE 950, where the NodeB 910 may be network entity 112 and/or network entity 114, and where UE 950 may be UE 102 that may include an IRAT cell reselection manager 104 (FIGS. 1-2). In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the NodeB 910. More specifically, the receive processor 970 descrambles and de-spreads the symbols, and then determines the most likely signal constellation points transmitted by the NodeB 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 890 may also use an acknowledgement (ACK) and/or negative acknowledgement (NACK) protocol to support retransmission requests for those frames.

In the uplink, data from a data source 978 and control signals from the controller/processor 890 are provided to a transmit processor 980. The data source 978 may represent applications running in the UE 950 and various user interfaces (e.g., keyboard). Similar to the functionality described in connection with the downlink transmission by the NodeB 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the NodeB 910 or from feedback contained in the mid-amble transmitted by the NodeB 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the NodeB 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 880 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the NodeB 910 and the UE 950, respectively. For example, the controller/processors 940 and 990 may provide various functions including timing, peripheral interfaces, voltage regulation, power management, and other control functions. The computer readable media of memories 942 and 992 may store data and software for the NodeB 910 and the UE 950, respectively. A scheduler/processor 946 at the NodeB 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer.

The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for inter radio access technology (IRAT) cell reselection, comprising:
    identifying that a user equipment (UE) in an idle or a discontinuous reception (DRX) mode is camped on a cell of a first RAT, wherein the cell belongs to a public land mobile network (PLMN) identifier associated with an operator and the first RAT;
    determining that neighbor information broadcast by the cell the UE is camped on does not include information of any neighbor cell of a second RAT and that the PLMN identifier associated with the cell of the first RAT belongs to a known list of PLMN identifiers;
    determining that the UE is configured to enable searching for one or more frequencies of the second RAT in response to determining that the cell the UE is camped on is not broadcasting any neighbor cell of the second RAT and that the PLMN identifier associated with the cell of the first RAT belongs to the known list of PLMN identifiers;
    scanning the one or more frequencies of the second RAT associated with the PLMN identifier of the operator in response to determining that the PLMN identifier has functionality enabled to search for the one or more frequencies of the second RAT, wherein the scanning for the one or more frequencies of the second RAT associated with the PLMN identifier of the operator is performed in a background at the UE; and
    triggering a cell reselection to a cell of the second RAT, wherein the cell of the second RAT is associated with a frequency identified during the scanning.

2. The method of claim 1, further comprising performing the cell reselection to the cell of the second RAT, wherein the performing further comprises:
    checking whether cell reselection criteria are met;
    suspending activities of the first RAT;
    acquiring the cell of the second RAT; and
    stopping the activities of the first RAT and transitioning the UE to the cell of the second RAT.

3. The method of claim 1, wherein the scanning the one or more frequencies is enabled or disabled by configuring a frequency scanning parameter at the UE.

4. The method of claim 3, wherein the enabling or disabling of the frequency scanning parameter is via a user interface at the UE.

5. The method of claim 1, wherein the first RAT is Global System for Mobile Communications (GSM), Code Division Multiple Access (CDMA), Wideband-CDMA (W-CDMA) or High Speed Packet Access (HSPA), and the second RAT is long term evolution (LTE) or Worldwide Interoperability for Microwave Access (WiMAX).

6. An apparatus for inter radio access technology (IRAT) cell reselection, comprising:
    means for identifying that a user equipment (UE) in an idle or a discontinuous reception (DRX) mode is camped on a cell of a first RAT, wherein the cell belongs to a public land mobile network (PLMN) identifier associated with an operator and the first RAT;
    means for determining that neighbor information broadcast by the cell the UE is camped on does not include information of any neighbor cell of a second RAT and that the PLMN identifier associated with the cell of the first RAT belongs to a known list of PLMN identifiers;
    means for determining that the UE is configured to enable searching for one or more frequencies of the second RAT in response to determining that the cell the UE is camped on is not broadcasting any neighbor cell of the second RAT and that the PLMN identifier associated with the cell of the first RAT belongs to the known list of PLMN identifiers;
    means for scanning the one or more frequencies of the second RAT associated with the PLMN identifier of the operator in response to determining that the PLMN identifier has functionality enabled to search for the one or more frequencies of the second RAT, wherein the means for scanning includes means for performing the scanning for the one or more frequencies of the second RAT associated with the PLMN identifier of the operator in a background at the UE; and
    means for triggering a cell reselection to a cell of the second RAT, wherein the cell of the second RAT is associated with a frequency identified during the scanning.

7. The apparatus of claim 6, further comprising means for performing the cell reselection to the cell of the second RAT, wherein the means for performing further comprises:
   means for checking whether cell selection reselection criteria are met;
   means for suspending activities of the first RAT;
   means for acquiring the cell of the second RAT; and
   means for stopping the activities of the first RAT and transitioning the UE to the cell of the second RAT.

8. The apparatus of claim 6, wherein the means for scanning the one or more frequencies includes means for enabling or disabling the scanning by configuring a frequency scanning parameter at the UE.

9. The apparatus of claim 8, wherein the means for enabling or disabling of the frequency scanning parameter comprises a user interface at the UE.

10. The apparatus of claim 6, wherein the first RAT is Global System for Mobile Communications (GSM), Code Division Multiple Access (CDMA), Wideband-CDMA (W-CDMA) or High Speed Packet Access (HSPA), and the second RAT is long term evolution (LTE) or Worldwide Interoperability for Microwave Access (WiMAX).

11. A non-transitory computer readable medium storing computer executable code for improved reselection during mode transitions, comprising:
   code for identifying that a user equipment (UE) in an idle or a discontinuous reception (DRX) mode is camped on a cell of a first RAT, wherein the cell belongs to a public land mobile network (PLMN) identifier associated with an operator and the first RAT;
   code for determining that neighbor information broadcast by the cell the UE is camped on does not include information of any neighbor cell of a second RAT and that the PLMN identifier associated with the cell of the first RAT belongs to a known list of PLMN identifiers;
   code for determining that the UE is configured to enable searching for one or more frequencies of the second RAT in response to determining that the cell the UE is camped on is not broadcasting any neighbor cell of the second RAT and that the PLMN identifier associated with the cell of the first RAT belongs to the known list of PLMN identifiers;
   code for scanning the one or more frequencies of the second RAT associated with the PLMN identifier of the operator in response to determining that the PLMN identifier has functionality enabled to search for the one or more frequencies of the second RAT, wherein the code for scanning includes code for performing the scanning for the one or more frequencies of the second RAT associated with the PLMN identifier of the operator in a background at the UE; and
   code for triggering a cell reselection to a cell of the second RAT, wherein the cell of the second RAT is associated with a frequency identified during the scanning.

12. The computer readable medium of claim 11, further comprising code for performing the cell reselection to the cell of the second RAT, wherein the code for performing further comprises:
   code for checking whether cell reselection criteria are met;
   code for suspending activities of the first RAT;
   code for acquiring the cell of the second RAT; and
   code for stopping the activities of the first RAT and transitioning the UE to the cell of the second RAT.

13. The computer readable medium of claim 11, wherein the code for scanning the one or more frequencies includes code for enabling or disabling the scanning by configuring a frequency scanning parameter at the UE.

14. The computer readable medium of claim 13, wherein the code for enabling or disabling of the frequency scanning parameter comprises code for enabling or disabling via a user interface at the UE.

15. The computer readable medium of claim 11, wherein the first RAT is Global System for Mobile Communications (GSM), Code Division Multiple Access (CDMA), Wideband-CDMA (W-CDMA) or High Speed Packet Access (HSPA), and the second RAT is long term evolution LTE) or Worldwide Interoperability for Microwave Access (WiMAX).

16. An apparatus for inter radio access technology (IRAT) cell reselection, comprising:
   a RAT identifying component to identify that a user equipment (UE) in an idle or a discontinuous reception (DRX) mode is camped on a cell of a first RAT, wherein the cell belongs to a public land mobile network (PLMN) identifier associated with an operator and the first RAT;
   a neighbor broadcasting determining component to determine that neighbor information broadcast by the cell the UE is camped on does not include information of any neighbor cell of a second RAT and that the PLMN identifier associated with the cell of the first RAT belongs to a known list of PLMN identifiers;
   a PLMN identifier matching component to determine that the UE is configured to enable searching for one or more frequencies of the second RAT in response to determining that the cell the UE is camped on is not broadcasting any neighbor cell of the second RAT and that the PLMN identifier associated with the cell of the first RAT belongs to the known list of PLMN identifiers;
   a frequency scanning component to scan the one or more frequencies of the second RAT associated with the PLMN identifier of the operator in response to the determination that the PLMN identifier has functionality enabled to search for the one or more frequencies of the second RAT, wherein the frequency scanning component is configured to perform the scan for the one or more frequencies of the second RAT associated with the PLMN identifier of the operator in a background at the UE; and
   a cell reselection component to trigger a cell reselection to a cell of the second RAT, wherein the cell of the second RAT is associated with a frequency identified during the scanning.

17. The apparatus of claim 16, wherein cell reselection component is further configured to perform the cell reselection to the cell of the second RAT, and wherein the cell reselection component is further configured to:
   check whether cell selection reselection criteria are met;
   suspend activities of the first RAT;
   acquire the cell of the second RAT; and
   stop the activities of the first RAT and transition the UE to the cell of the second RAT.

18. The apparatus of claim 16, wherein the frequency scanning component is further configured to enable or disable scanning the one or more frequencies by further configuring a frequency scanning parameter at the UE.

19. The apparatus of claim 18, wherein the frequency scanning component is further configured to receive the frequency scanning parameter via a user interface at the UE.

20. The apparatus of claim 16, wherein the first RAT is Global System for Mobile Communications (GSM), Code Division Multiple Access (CDMA), Wideband-CDMA (W-CDMA) or High Speed Packet Access (HSPA), and the second RAT is long term evolution (LTE) or Worldwide Interoperability for Microwave Access (WiMAX).

\* \* \* \* \*